United States Patent
Wang et al.

(10) Patent No.: US 10,819,976 B2
(45) Date of Patent: Oct. 27, 2020

(54) LONG-TERM REFERENCE FOR ERROR RECOVERY WITHOUT BACK CHANNEL

(71) Applicant: Polycom, Inc., San Jose, CA (US)

(72) Inventors: Jian Wang, Burnaby (CA); Yong Yan, Austin, TX (US); Kui Zhang, Austin, TX (US)

(73) Assignee: Polycom, Inc., San Jose, CA (US)

( * ) Notice: Subject to any disclaimer, the term of this patent is extended or adjusted under 35 U.S.C. 154(b) by 0 days.

(21) Appl. No.: 16/017,842

(22) Filed: Jun. 25, 2018

(65) Prior Publication Data

US 2019/0394458 A1    Dec. 26, 2019

(51) Int. Cl.
*H04N 19/15*      (2014.01)
*H04N 19/105*     (2014.01)
*H04N 19/159*     (2014.01)
*H04N 19/172*     (2014.01)
*H04N 19/142*     (2014.01)
*H04N 7/15*       (2006.01)

(52) U.S. Cl.
CPC ............. *H04N 19/105* (2014.11); *H04N 7/15* (2013.01); *H04N 19/142* (2014.11); *H04N 19/159* (2014.11); *H04N 19/172* (2014.11)

(58) Field of Classification Search
CPC .. H04N 19/105; H04N 19/142; H04N 19/159; H04N 19/172; H04N 7/15
See application file for complete search history.

(56) References Cited

U.S. PATENT DOCUMENTS

| | | | |
|---|---|---|---|
| 2006/0039475 A1* | 2/2006 | Liu | H04N 7/152 375/240.16 |
| 2011/0249729 A1* | 10/2011 | Zhou | H04N 19/105 375/240.07 |
| 2012/0219067 A1* | 8/2012 | Jefremov | H04N 19/105 375/240.24 |
| 2017/0214938 A1* | 7/2017 | Zhang | H04N 19/177 |

* cited by examiner

*Primary Examiner* — Tsion B Owens
(74) *Attorney, Agent, or Firm* — Keith Lutsch, PC (57) ABSTRACT

A video encoding method eliminates the need for back channel feedback by using long-term reference frames for recovering data transmission errors. A videoconferencing endpoint captures image data and designates a first frame as a long term reference (LTR) frame. Subsequent intra frames us the LTR frame for reference. When a new LTR frame is designated, subsequent frames use the newly designated LTR frame for reference only after it is determined that the newly designated LTR frame is fully operational to serve in that role.

20 Claims, 4 Drawing Sheets

LONG-TERM REFERENCE FOR ERROR RECOVERY WITHOUT BACK CHANNEL

TECHNICAL FIELD

This disclosure relates to video processing, and more particularly to adaptively using long-term reference frames for recovering data transmission errors, without the need for back channel feedback.

BACKGROUND

In signal processing, data compression, source coding, or bit-rate reduction involves encoding information using fewer bits than the original representation. Compression can be either lossy or lossless. Lossless compression reduces bits by identifying and eliminating statistical redundancy. No information is lost in lossless compression. Lossy compression reduces bits by removing unnecessary or less important information.

The process of reducing the size of a data file is often referred to as data compression. In the context of data transmission, it is called source coding; encoding done at the source of the data before it is stored or transmitted. Source coding should not be confused with channel coding, for error detection and correction or line coding, the means for mapping data onto a signal.

Compression is useful because it reduces resources required to store and transmit data. Computational resources are consumed in the compression process and, usually, in the reversal of the process (decompression). Data compression is subject to a space-time complexity trade-off. For instance, a compression scheme for video may require expensive hardware for the video to be decompressed fast enough to be viewed as it is being decompressed, and the option to decompress the video in full before watching it may be inconvenient or require additional storage. The design of data compression schemes involves trade-offs among various factors, including the degree of compression, the amount of distortion introduced (when using lossy data compression), and the computational resources required to compress and decompress the data.

Video data may be represented as a series of still image frames. Such data usually contains abundant amounts of spatial and temporal redundancy. Video compression algorithms attempt to reduce redundancy and store information more compactly. Inter-frame compression (a temporal delta encoding method) is one of the most powerful compression techniques. It (re)uses data from, one or more, earlier or later frames in a sequence to describe the current frame. Intra-frame coding, on the other hand, uses only data from within the current frame, effectively being still-image compression. Intra-frame coding uses lossy compression algorithms.

With the advance of network technology and CPU processing power, multi-media sources, especially video sources, are becoming more and more prevalent. Most of the time, video is transmitted over one or more internet protocol network. In data compression, data packets (corresponding to portions of frames, or one or more frames) can get lost during transmission, which tends to degrade video quality at the receiving end. There are a number of conventional methods which attempt to remedy the problem. However, none has been wholly satisfactory. Thus, there is room for improvement in the art.

BRIEF DESCRIPTION OF THE DRAWINGS

For the purpose of illustration, there are shown in the drawings certain embodiments described in the present disclosure. In the drawings, like numerals indicate like elements throughout. It should be understood that the full scope of the inventions disclosed herein are not limited to the precise arrangements, dimensions, and instruments shown. In the drawings.

DETAILED DESCRIPTION

In the drawings and the description of the drawings herein, certain terminology is used for convenience only and is not to be taken as limiting the embodiments of the present disclosure. In the drawings and the description below, like numerals indicate like elements throughout.

Figure 1:
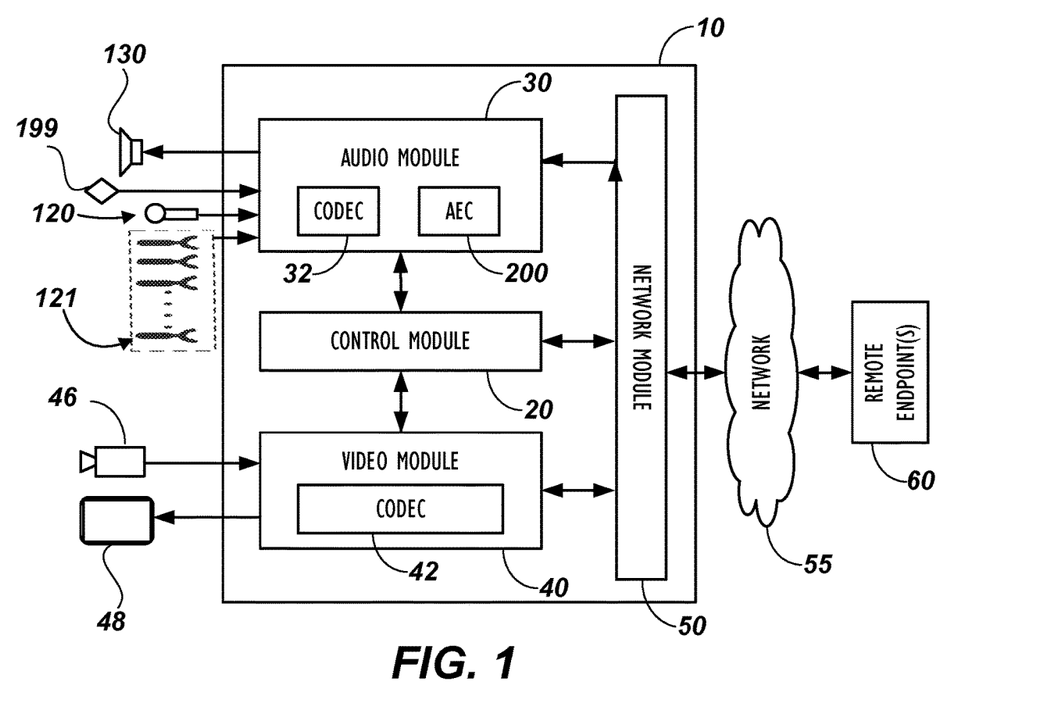
FIG. 1 illustrates an operational environment of embodiments of this disclosure.

FIG. 1 illustrates a possible operational environment for example circuits of this disclosure. Specifically, FIG. 1 illustrates a conferencing apparatus or endpoint 10 in accordance with an embodiment of this disclosure. Conferencing apparatus or endpoint 10 of FIG. 1 communicates with one or more remote endpoints 60 over a network 55. The endpoint 10 includes an audio module 30 with an audio codec 32, and a video module 40 with a video codec 42. These modules 30/40 operatively couple to a control module 20 and a network module 50. In implementations of the technology which only involve audio communication, video module 40 with a video codec 42 can be omitted.

A microphone 120 captures audio and provides the audio to the audio module 30 and codec 32 for processing. The microphone 120 can be a table or ceiling microphone, a part of a microphone pod, an integral microphone to the endpoint, or the like. Additional microphones 121 can also be provided. Throughout this disclosure all descriptions relating to microphone 120 apply to any additional microphones 121, unless otherwise indicated. The endpoint 10 uses the audio captured with the microphone 120 primarily for the conference audio. In general, the endpoint 10 can be a conferencing device, a videoconferencing device, a personal computer with audio or video conferencing abilities, or any similar type of communication device. If the endpoint 10 is used for videoconferencing, a camera 46 captures video and provides the captured video to the video module 40 and codec 42 for processing.

After capturing audio and video, the endpoint 10 encodes it using any of the common encoding standards, such as MPEG-1, MPEG-2, MPEG-4, H.261, H.263 and H.264. Then, the network module 50 outputs the encoded audio and video to the remote endpoints 60 via the network 55 using any appropriate protocol. Similarly, the network module 50 receives conference audio and video via the network 55 from the remote endpoints 60 and sends these to their respective codec 32/42 for processing. Eventually, a loudspeaker 130 outputs conference audio (received from a remote endpoint), and a display 48 can output conference video. The endpoint 10 includes a distortion detection module 199 for detecting distortion that may be introduced when the loudspeaker 130 outputs audio.

The endpoint 10 further includes an acoustic echo cancellation module 200 that reduces acoustic echo. Acoustic echo results from far-end audio output by the loudspeaker 130 being subsequently picked up by the local microphone 120, reprocessed, and sent back to the far-end. Additional microphones 121 can operate by the same principle. The acoustic echo cancellation module 200 can be based on acoustic echo cancellation techniques known and used in the art to reduce or eliminate this form of echo.

Figure 2:
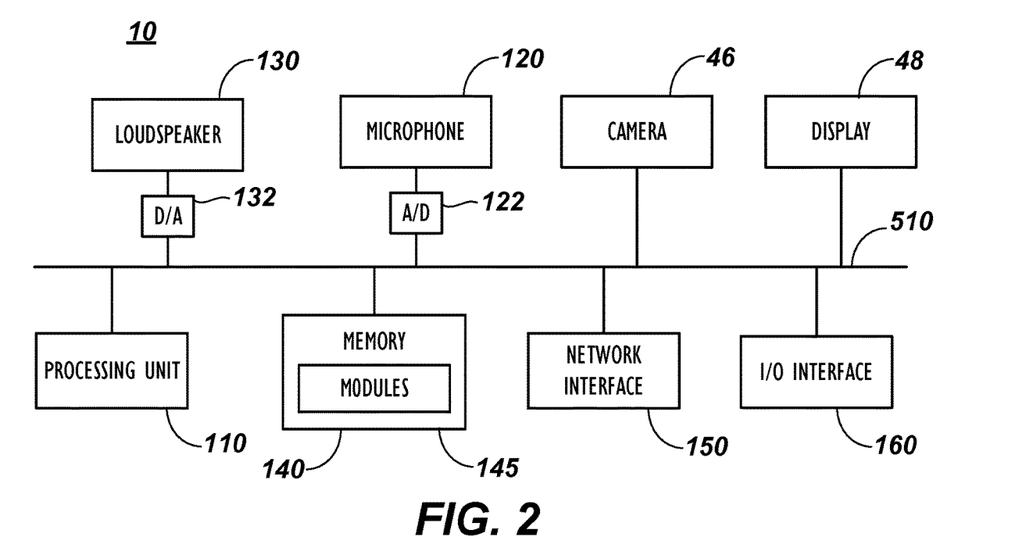
FIG. 2 illustrates components of the operational environment of FIG. 1.

FIG. 2 illustrates components of the conferencing endpoint of FIG. 1 in detail. The endpoint 10 has a processing unit 110, memory 140, a network interface 150, and a general input/output (I/O) interface 160 coupled via a bus 510. As above, the endpoint 10 has the base microphone 120 and loudspeaker 130 and can have the video components of a camera 46 and a display 48 if desired.

The memory 140 can be any conventional memory such as SDRAM and can store modules 145 in the form of software and firmware for controlling the endpoint 10. The stored modules 145 include the various video and audio codecs 32/42 and other modules 20/30/40/50/200 discussed previously. Moreover, the modules 145 can include operating systems, a graphical user interface (GUI) that enables users to control the endpoint 10, and other algorithms for processing audio/video signals.

The network interface 150 provides communications between the endpoint 10 and remote endpoints (60). By contrast, the general I/O interface 160 can provide data transmission with local devices such as a keyboard, mouse, printer, overhead projector, display, external loudspeakers, additional cameras, microphones, etc.

During operation, the loudspeaker 130 outputs audio in the conference environment. For example, this output audio can include far-end audio received from remote endpoints via the network interface 150 and processed with the processing unit 110 using the appropriate modules 145. At the same time, the microphone 120 captures audio in the conference environment and produces audio signals transmitted via the bus 510 to the processing unit 110.

For the captured audio, the processing unit 110 processes the audio using algorithms in the modules 145. In general, the endpoint 10 processes the near-end audio captured by the microphone 120 and the far-end audio received from the transmission interface 150 to reduce noise and cancel out acoustic echo that may occur between the captured audio. Ultimately, the processed audio can be sent to local and remote devices coupled to interfaces 150/160. In particular, the endpoint 10 uses the acoustic echo canceller 200 of FIG. 1 that can operate on the signal processor 110. The acoustic echo canceller 200 removes the echo signal from captured near-end signal that may be present due to the loudspeaker 130 in the conference environment.

As shown in FIG. 2, the microphone 120 uses an analog-to-digital (ADC) converter 122. The ADC 122 can correspond to, or can incorporate, the audio processing circuit (300) discussed below. The loudspeaker 130 uses a digital-to-analog (DAC) converter 132. When attempting to ameliorate the effects of distortion in the loudspeaker 130 audio, digital and analog gain of each component may need to be taken into account. The audio processing circuit (300) discussed below can serve to minimize noise in audio captured by microphone 120. Cameras with speaker tracking capability find the current speaker and either point the camera to the speaker or zoom in to the speaker.

Figure 3:
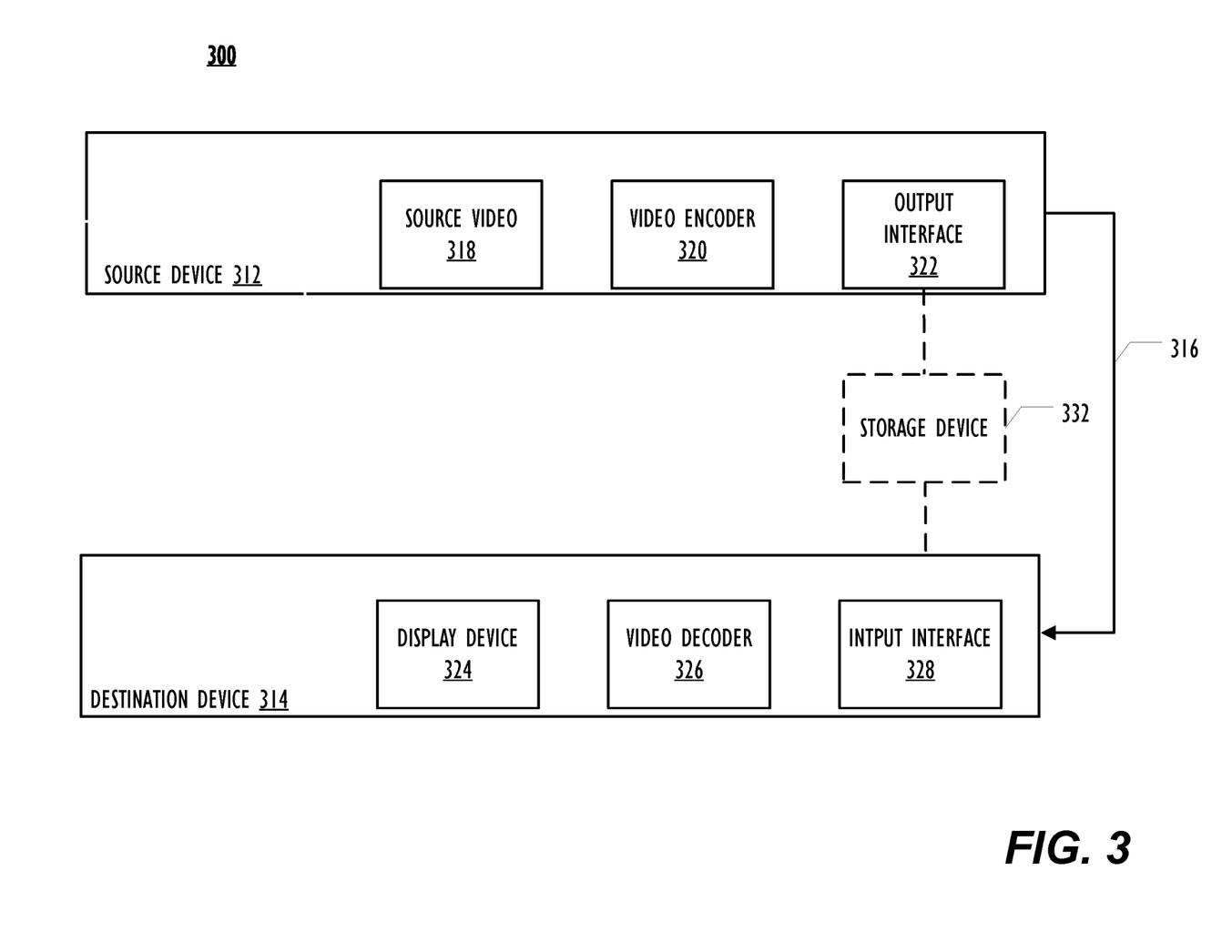
FIG. 3 is a block diagram illustrating an example video encoding/decoding system that can utilize the loss recovery techniques described in this disclosure.

FIG. 3 is a block diagram illustrating an example video encoding and decoding system that may utilize the loss recovery techniques described in this disclosure. As shown in FIG. 3, system 300 includes a source device 312 that generates encoded video data to be decoded at a later time by a destination device 314. Source device 312 and destination device 314 may comprise any of a wide range of devices, including desktop computers, notebook (i.e., laptop) computers, tablet computers, set-top boxes, telephone handsets such as so called "smart" phones, so-called "smart" pads, televisions, cameras, display devices, digital media players, video gaming consoles, video streaming device, or the like. In some cases, source device 312 and destination device 314 may be equipped for wireless communication.

Destination device 314 may receive the encoded video data to be decoded via a link 316. Link 316 may comprise any type of medium or device capable of moving the encoded video data from source device 312 to destination device 314. In one example, link 316 may comprise a communication medium to enable source device 312 to transmit encoded video data directly to destination device 314 in real-time. The encoded video data may be modulated according to a communication standard, such as a wireless communication protocol, and transmitted to destination device 314. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 312 to destination device 314.

Alternatively, encoded data may be output from output interface 322 to a storage device 332. Similarly, encoded data may be accessed from storage device 332 by input inter face. Storage device 332 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 332 may correspond to a file server or another intermediate storage device that may hold the encoded video generated by source device 312. Destination device 314 may access stored video data from storage device 332 via streaming or download. The file server may be any type of server capable of storing encoded video data and transmit ting that encoded video data to the destination device 314. Example file servers include a web server (e. g., for a website), an FTP server, network attached storage (NAS) devices, or a local disk drive. Destination device 314 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 332 may be a streaming transmission, a download transmission, or a combination of both.

The techniques of this disclosure are not necessarily limited to wireless applications or settings. The techniques may be applied to video coding in support of any of a variety of multimedia applications, such as over-the air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 300 may be configured to support one-way or two-way video transmission to support applications such as video streaming, video playback, video broad casting, and/or video telephony.

In the example of FIG. 3, source device 312 includes a video source 318, video encoder 320 and an output interface 322. In some cases, output interface 322 may include a modulator/demodulator (modem) and/or a transmitter. In source device 312, video source 318 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 318 is a video camera, source device 312 and destination device 314 may form so-called camera phones or video phones. However, the techniques described in this disclosure may be applicable to video coding in general, and may be applied to wireless and/or wired applications. The captured, pre-captured, or computer-generated video may be encoded by video encoder 320. The encoded video data may be transmitted directly to destination device 314 via output interface 322 of source device 312. The encoded video data may also (or alternatively) be stored onto storage device 332 for later access by destination device 314 or other devices, for decoding and/or playback.

Destination device 314 includes an input interface 328, a video decoder 326, and a display device 324 (e.g., 48). In some cases, input interface 328 may include a receiver and/or a modem. Input interface 328 of destination device 314 receives the encoded video data over link 316. The encoded video data communicated over link 316, or provided on storage device 332, may include a variety of syntax elements generated by video encoder 320 for use by a video decoder, such as video decoder 326, in decoding the video data. Such syntax elements may be included with the encoded video data transmitted on a communication medium, stored on a storage medium, or stored a file server.

Display device 324 may be integrated with, or external to, destination device 314. In some examples, destination device 314 may include an integrated display device and also be configured to interface with an external display device. In other examples, destination device 314 may be a display device. In general, display device 324 displays the decoded video data to a user, and may comprise any of a variety of display devices such as a liquid crystal display (LCD), a plasma display, an organic light emitting diode (OLED) display, or another type of display device.

Video encoder 320 and video decoder 326 may operate according to other video compression standards, including the High Efficiency Video Coding (HEVC) standard presently under development. The techniques of this disclosure, however, are not limited to any particular coding standard or technique. Alternatively, video encoder 320 and video decoder 326 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 3, in some aspects, video encoder 320 and video decoder 326 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (U DP).

Video encoder 320 and video decoder 326 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 320 and video decoder 326 may be included in one or more encoders or decoders, either of which may be integrated as part of a combined encoder/decoder (CODEC) in a respective device.

There are various ways to recover from packet loss in video processing. For example, when a receiving end detects a packet loss, the receiving end can send a request to the video source—the transmitter—to send an intra frame (a/k/a I-frame) to recover the receiving end. Intra frames are coded without reference to other frames, and can be used to fix the visual artifacts in a corrupted frame. Intra frames require greater amounts of data than inter frames (a/k/a P frames and B frames).

Embodiments of this disclosure pertain to recovering from lost data packets using a Gradual Decoder Refresh (GDR) method or using a Long-Term Reference Frame (LTRF) method. In an embodiment of a GDR method, a decoder gradually refreshes images in order to avoid sudden network bandwidth peak, for example by refreshing a few rows of macroblocks at a time. In this embodiment, video quality at the receiving end is not recovered by a single GDR frame, but rather through a period of GDR frames.

In an embodiment of the LTRF method, a receiver to stores one or more reference frames for an extended period. The stored reference frames are then used for reference when there is packet loss. If LTR frames are available when a packet loss is detected, the transmitter codes one or more P or B frames using one or more LTR frames for reference. The transmitter then transmits the replacement P or B frames, rather than providing an intra frame. The LTRF method can thus utilize smaller frames than intra frame based methods, thereby enabling video quality to be recovered quickly with arrival of first LTR frame (the replacement P or B frame). In some LTRF-based embodiments, it can be beneficial for a transmitter and receiver to have back channel communications to confirm that LTR frames are available at both sides.

Figure 4:
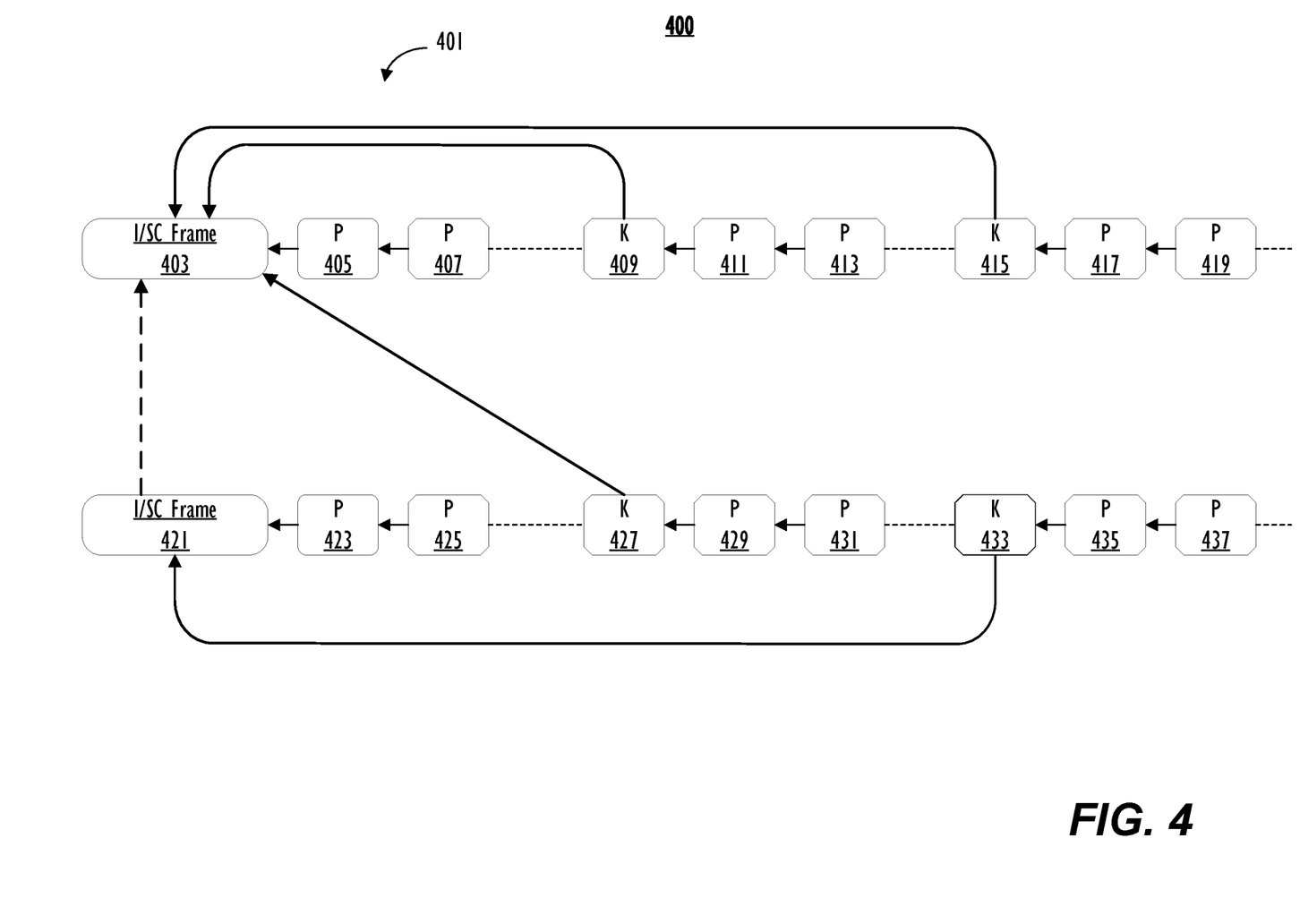
FIG. 4 illustrates an encoder and a method of encoding a stream of data, in accordance with an embodiment of this disclosure.

However, in some embodiments, the need for back channel communications is substantially obviated. For example, when there is a new intra frame or scene change frame in the frame buffer, the new frame is designated as a LTR frame 403. Initially, when the system 400 starts running, the first intra frame is marked as a LTR frame 403. Frames 405, 407, 411, 413, 417, and 419 are normal P frames. K frames 409, 415, 427, and 433 are special P frames. The K frames 409, 415, 427, and 433 use LTR frame 403 as a reference frame, such as frame 0. To operate optimally, a decoder requires that a reference infra frame be available, so an initial LTR frame should be available. Since each of K frames 409, 415, 427, and 433 refers to LTR frame 403 or LTR frame 421, any packet loss in P frames 405, 407, 411, 413, 417, and 419 will be fixed when next good a K frame arrives. Hence, there is no need for back channel feedback; the decoder never needs to send a fast update request to the encoder.

As the timing distance between a K frame and a LTR frame increases, the more compression loss becomes a factor because possible scene changes and/or relatively greater amounts of motion between encoding of the LTR frame and the K frame means that there are greater differences between the current K frame and the predicted LTR frame. When there is a large difference between the pixel data of a K frame and that of a LTR frame, such as when there is scene change between the K frame and the LTR frame, compression loss becomes quite significant. To address these issues with compression loss, a new LTR frame is placed in the LTRF buffer whenever a scene change occurs. The new frame at scene change will be marked as LTR frame 403 and refer to previous LTR frame 421. LTR frame 421 can be preserved in a reference buffer for a suitable period of time.

In an embodiment of this disclosure, the time period between encoding a given LTR and encoding the first K frame which follows that LTR frame is approximately eight times as long as the maximum latency associated with sending a packet from the encoder to the decoder and sending a reply from the decoder to the encoder. During this period, the K frames received after the second LTR 421 still refer to LTR frame 403, to make ensure the decoder has a good reference frame. The delay period helps to ensure that decoder 400 receives the second LTR frame properly. Once the period has elapsed, the system 400 removes the first LTR frame 403, and subsequently received K frames will refer to the second LTR frame. In some embodiments, encoder 400 will periodically update the LTR frame buffer even if there is no scene change to improve coding efficiency.

FIG. 4 illustrates an encoder 400 that uses a LTRF-based method 401 of encoding data so as to enable recovering from data loss at decoder without the need for back channel communications. Frame 403 is captured and encoded at a first time (a/k/a $t_0$) by encoder 401 (e.g., 42). Encoder 401 designates frame 403 as a reference frame, and that designation will be sent to a decoder (not shown). Frame 403 is an intra frame, which means that frame 403 does not refer to another frame a reference frame. Any errors in an infra frame are corrected/concealed by deriving missing data from nearby pixels within the frame. This discussion of FIG. 4 assumes that the very first reference frame 403 is complete and capable of properly being decoded by the decoder in question.

Thereafter, P frame 405 is encoded and sent to the encoder at $t_1$. The encoder 401 uses reference frame 403 for reference when encoding P frame 405 as part of data compression operations. P frame 405 is an inter frame (and is designated as such by encoder 401, and uses intra frame 403 as a reference frame when being decoded by the decoder to which it is transmitted. (This relationship applies to each of the inter frames discussed herein, that is the encoder 401 uses reference frames to reduce or eliminate unnecessary calculations, and the decoder does the same by copying relevant information from the reference frame (e.g., 403) that is at the decoder side.) P frame 407 is encoded and transmitted at $t_2$. P frame 407 uses P frame 405 as a reference frame. As more frames are encoded and transmitted, degradation due to any packet loss will increase, as each successive frame (indicated by the ellipses between P 407 and K 409) refers to the frame sent immediately prior (e.g., 407 referring to 405). At $t_3$, K frame 409 is encoded by encoder 401 for transmission to the decoder. Like P frame 405 and P frame 407, K frame 407 is encoded as an inter frame. However, K frame 407 uses intra frame 403 as a reference frame. At $t_4$, P frame 411 is encoded and sent to the decoder. P frame 411 uses K frame 409 as a reference frame, which, as noted, used inter frame 403 as a reference frame. At $t_5$ P frame 413 is encoded, using frame 411 as a reference frame. K frame 415 is encoded at $t_6$. Like K frame 409, K frame 415 refers to intra frame as a reference frame. Doing so will allow for the decoder to compensate for degradation due to packet loss from when the decoder receives P frame 411 to when the decoder receives K frame 415. This pattern continues, with P frame 417 being encoded at $t_7$ and P frame 419 at $t_8$, until, at $t_9$, encoder 401 encodes and designates frame 421 as a replacement long term reference (LTR) frame. Frame 421 can be an intra frame, in which case it does not use frame 403 as a reference. Frame 421 can be an inter frame, being designated as a LTR frame when a scene being encoded by encoder 401 changes from that of the preceding frame (a frame encoded after P frame 419, in this example). P frame 423 ($t_{10}$) and P frame 425 ($t_{11}$), and the frames that follow them, use frame 421 as a reference frame. However, K frame 427 does not.

Although frame 421 is designated as an LTR, it does not serve in that role until the encoder 401 determines that a complete and accurate LTR frame 421 was received and decoded by the decoder. To be more exact, if, after a predetermined time elapses in which the encoder 401 does not receive an indication that the decoder failed to receive or was otherwise unable to decode frame 421, the encoder 401 will cease to use frame 403 at a LTR frame, and will use frame 421 instead, and will instruct the decoder to do the same. In either case, frame 421 does not immediately take the place of frame 403 as the LTR frame. At $t_{12}$, K frame 427 uses LTR frame 403 for reference. P frame 429 uses K frame 427 for reference at $t_{13}$, and at $t_{14}$ P frame 431 refers to P frame 429 and so on, until the encoder (in effect) determines that frame 421 is fully operational at the decoder to serve as LTR. At that point ($t_{15}$), K frame 433 uses LTR frame for reference. Thereafter, at $t_{16}$ P frame 435 refers to K frame 433, and at $t_{17}$ P frame 437 refers to P frame 435 and so on until LTR frame is replaced in the manner described for LTR 403.

Figure 5:
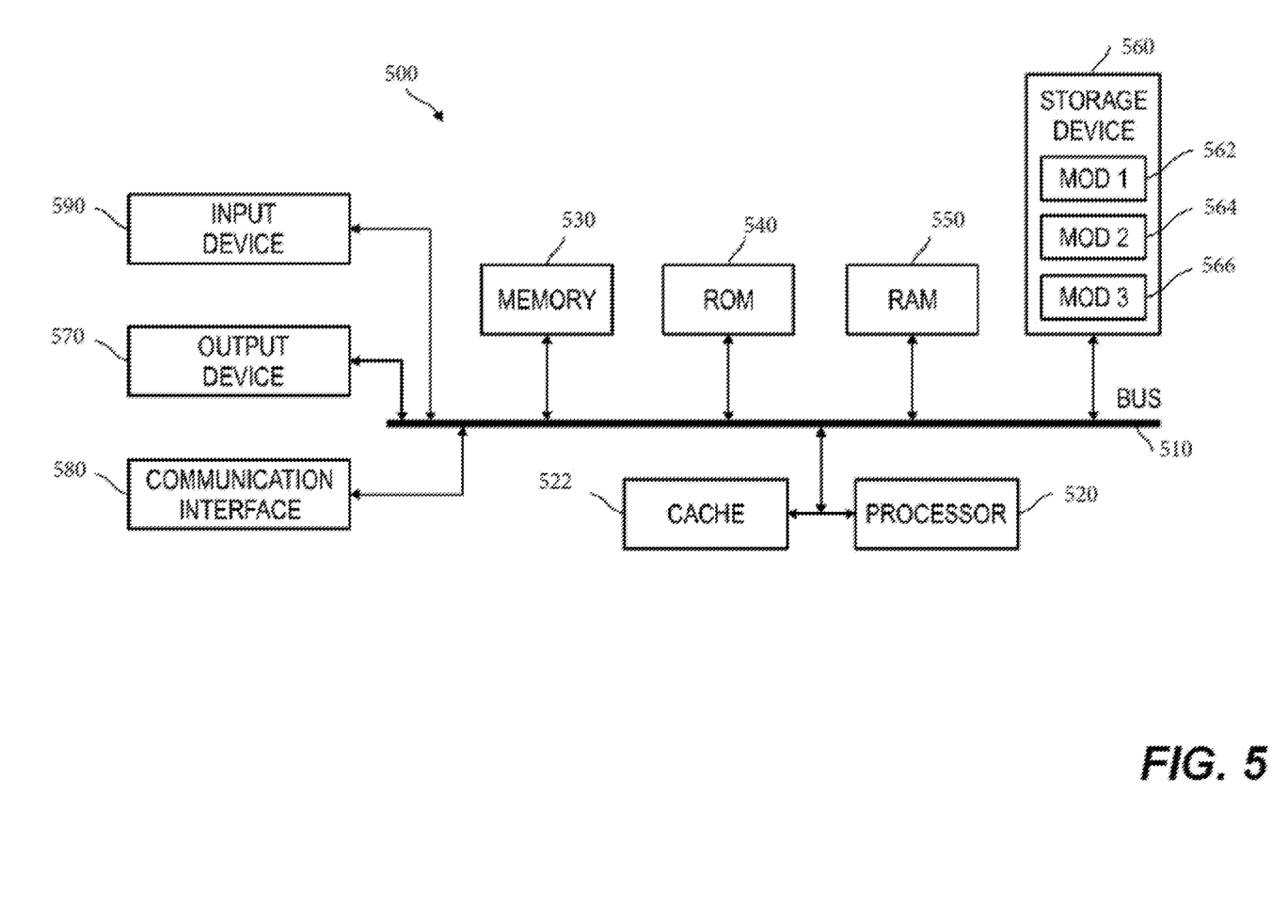
FIG. 5 illustrates an electronic device which can be employed to practice the concepts and methods of this disclosure.

FIG. 5 illustrates an electronic device 500 (such as endpoint 10) which can be employed to practice the concepts and methods described above. The components disclosed herein can be incorporated in whole or in part into tablet computers, personal computers, handsets and other devices utilizing one or more microphones. As shown, device 500 can include a processing unit (CPU or processor) 520 and a system bus 510 that couples various system components including the system memory 530, as read only memory (ROM) 540 and random access memory (RAM) 550 to the processor 520. The device 500 can include a cache 522 of high speed memory connected directly with, in close proximity to, or integrated as part of the processor 520. The device 500 copies data from the memory 530 and/or the storage device 560 to the cache 522 for quick access by the processor 520. In this way, the cache 522 provides a performance boost that avoids processor 520 delays while waiting for data. These and other modules can control or be configured to control the processor 520 to perform various actions. Other system memory (not shown) may be available for use as well. The memory 530 can include multiple different types of memory with different performance characteristics. The processor 520 can include any general purpose processor and a hardware module or software module, such as module 1 (562), module 2 (564), and module 3 (566) stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output system (BIOS) stored in ROM 540 or the like, may provide the basic routine that helps to transfer information between elements within the device 500, such as during start-up. The device 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 can be connected to the system bus 510 by a drive interface (not shown). The drives and the associated computer readable storage media provide nonvolatile storage of computer readable instructions, data structures, program modules and other data for the device 500. In one aspect, a hardware module that performs a particular function includes the software component stored in a non-transitory computer-readable medium in connection with the necessary hardware components, such as the processor 520, bus 510, output device 570, input device 590, communication interface 580, and so forth, to carry out the function.

For clarity of explanation, the device of FIG. 5 is presented as including individual functional blocks including functional blocks labeled as a "processor" or processor 520. The functions these blocks represent may be provided through the use of either shared or dedicated hardware, including, but not limited to, hardware capable of executing software and hardware, such as a processor 520, that is purpose-built to operate as an equivalent to software executing on a general purpose processor. For example the functions of one or more processors presented in FIG. 5 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 540 for storing software performing the operations discussed below, and random access memory (RAM) 550 for storing results. Very large scale integration (VLSI) hardware embodiments, as well as custom VLSI circuitry in combination with a DSP circuit, may also be provided.

Embodiments of this disclosure include the following examples:

A. A data encoding method, the method comprising: designating a first frame as a long term reference (LTR) frame; encoding a second frame, the second frame being an inter frame referring to the first frame; encoding a plurality of third frames, each of the third frames being an inter frame and referring to a frame encoded immediately prior; encoding a fourth frame, the fourth frame being an inter frame referring to the first frame; encoding a fifth frame and designating the fifth frame as a LTR frame; encoding a plurality of sixth frames, each of the sixth frames being an inter frame and referring to a frame encoded immediately prior; encoding a seventh frame, the seventh frame being an inter frame referring to the first frame; determining that the fifth frame is operative to serve as the LTR frame; encoding, responsive to the determination, a seventh frame, the seventh frame being an inter frame referring to the fifth frame.

B. The data encoding method of example A, wherein the fifth frame is an inter frame referring to the first frame.

C. The data encoding method of example A, wherein the fifth frame is an intra frame.

D. The data encoding method of example A, wherein determining that the fifth frame is operative to serve as the LTR frame comprises determining that a fast update request has not been received within a predetermined period after the fifth frame was encoded.

E. The data encoding method of example D, wherein the predetermined period is 500 milliseconds or less.

F. The data encoding method of example A, wherein determining that the fifth frame is operative to serve as the LTR frame comprises determining that a fast update request has not been received during a time in which a predetermined number of frames was encoded since the fifth frame was designated as the LTR frame.

G. The data encoding method of example A, wherein designating the fifth frame as the LTR frame is responsive to detecting a scene change in a data stream which includes the first, second, third, fourth, and fifth frames.

H. A videoconferencing endpoint, the videoconferencing endpoint comprising: at least one camera unit configured to capture image data; a processor coupled to the camera unit; and a memory storing instructions executable by the processor, the instructions comprising instructions to: receive frames of image data from the camera unit; designate a first frame as a long term reference (LTR) frame; encode a second frame, the second frame being an inter frame referring to the first frame; encode a plurality of third frames, each of the third frames being an inter frame and referring to a frame encoded immediately prior; encode a fourth frame, the fourth frame being an inter frame referring to the first frame; encode a fifth frame and designating the fifth frame as a LTR frame; encode a plurality of sixth frames, each of the sixth frames being an inter frame and referring to a frame encoded immediately prior; encode a seventh frame, the seventh frame being an inter frame referring to the first frame; determine that the fifth frame is operative to serve as the LTR frame; encode, responsive to the determination, a seventh frame, the seventh frame being an inter frame referring to the fifth frame.

I. The videoconferencing endpoint of example H, wherein the fifth frame is an inter frame referring to the first frame.

J. The videoconferencing endpoint of example H, wherein the fifth frame is an intra frame.

K. The videoconferencing endpoint of example H, wherein the instructions to determine that the fifth frame is operative to serve as the LTR frame comprises instructions to determine that a fast update request has not been received within a predetermined period after encoding the fifth frame.

L. The data encoding method of example K, wherein the predetermined period is 5000 milliseconds or less.

M. The videoconferencing endpoint of example H, wherein the instructions to determine that the fifth frame is operative to serve as the LTR frame comprise instructions to determine that a fast update request has not been received during a time in which a predetermined number of frames was encoded since the fifth frame was designated as the LTR frame.

N. The videoconferencing endpoint of example H, wherein designating the fifth frame as the LTR frame is responsive to detecting a scene change in a data stream which includes the first, second, third, fourth, and fifth frames.

O. A non-transitory memory storing computer readable instructions executable by a processor, the instructions comprising instructions to: receive frames of image data from the camera unit; designate a first frame as a long term reference (LTR) frame; encode a second frame, the second frame being an inter frame referring to the first frame; encode a plurality of third frames, each of the third frames being an inter frame and referring to a frame encoded immediately prior; encode a fourth frame, the fourth frame being an inter frame referring to the first frame; encode a fifth frame and designating the fifth frame as a LTR frame; encode a plurality of sixth frames, each of the sixth frames being an inter frame and referring to a frame encoded immediately prior; encode a seventh frame, the seventh frame being an inter frame referring to the first frame; determine that the fifth frame is operative to serve as the LTR frame; encode, responsive to the determination, a seventh frame, the seventh frame being an inter frame referring to the fifth frame.

P. The non-transitory computer readable medium of example O, wherein the fifth frame is an inter frame referring to the first frame.

Q. The non-transitory computer readable medium of example O, wherein the fifth frame is an intra frame.

R. The non-transitory computer readable medium of example O, wherein the instructions to determined that the fifth frame is operative to serve as the LTR frame comprise instructions to determine that a fast update request has not been received within a predetermined period after the fifth frame was encoded.

S. The data encoding method of example K, wherein the predetermined period is 10000 milliseconds or less.

T. The non-transitory computer readable medium of example O, wherein the instructions to determine that the fifth frame is operative to serve as the LTR frame comprise instructions to determine that a fast update request has not been received during a time in which a predetermined number of frames was encoded since the fifth frame was designated as the LTR frame.

U. The non-transitory computer readable medium of example O, wherein designating the fifth frame as the LTR frame is responsive to detecting a scene change in a data stream which includes the first, second, third, fourth, and fifth frames.

The various embodiments described above are provided by way of illustration only, and should not be construed so as to limit the scope of the disclosure. Various modifications and changes can be made to the principles and embodiments described herein without departing from the scope of the disclosure and without departing from the claims which follow.

The invention claimed is:

1. A data encoding method, the method comprising:
designating a first frame as a long term reference (LTR) frame;
encoding a second frame after the first frame and designating the second frame as an LTR frame;
encoding a third frame after the second frame, the third frame being an inter frame referring to the first frame;
determining that the second frame is operative to serve as the LTR frame after encoding the third frame; and
encoding, responsive to the determination, a fourth frame after the third frame, the fourth frame being an inter frame referring to the second frame,
wherein determining that the second frame is operative to serve as the LTR frame comprises determining that a predetermined period has elapsed after the second frame was encoded.

2. The data encoding method of claim 1, wherein the second frame is an inter frame referring to the first frame.

3. The data encoding method of claim 1, wherein the second frame is an intra frame.

4. The data encoding method of claim 1, wherein the predetermined period is based on the lapse of time.

5. The data encoding method of claim 1, wherein determining that the second frame is operative to serve as the LTR frame further comprises determining that a fast update request has not been received during the predetermined period.

6. The data encoding method of claim 1, wherein the predetermined period is based on a number of frames encoded.

7. The data encoding method of claim 1, wherein designating the second frame as the LTR frame is responsive to detecting a scene change in a data stream which includes the first and second frames.

8. A videoconferencing endpoint, the videoconferencing endpoint comprising:
at least one camera unit configured to capture image data;
a processor coupled to the camera unit; and
a memory storing instructions executable by the processor, the instructions comprising instructions to:
receive frames of image data from the camera unit;
designate a first frame as a long term reference (LTR) frame;
encode a second frame after the first frame and designating the second frame as an LTR frame;
encode a third frame after the second frame, the third frame being an inter frame referring to the first frame;
determine that the second frame is operative to serve as the LTR frame after encoding the third frame; and
encode, responsive to the determination, a fourth frame after the third frame, the fourth frame being an inter frame referring to the second frame,
wherein the instructions to determine that the second frame is operative to serve as the LTR frame comprises instructions to determine that a predetermined period has elapsed after encoding the second frame.

9. The videoconferencing endpoint of claim 8, wherein the second frame is an inter frame referring to the first frame.

10. The videoconferencing endpoint of claim 8, wherein the second frame is an intra frame.

11. The videoconferencing endpoint of claim 8, wherein the predetermined period is based on the lapse of time.

12. The data encoding method of claim 8, wherein the instructions to determine that the second frame is operative to serve as the LTR frame further comprise instructions to determine that a fast update request has not been received during the predetermined period.

13. The videoconferencing endpoint of claim 8, wherein the predetermined period is based on a number of frames encoded.

14. The videoconferencing endpoint of claim 8, wherein designating the second frame as the LTR frame is responsive to detecting a scene change in a data stream which includes the first and second frames.

15. A non-transitory memory storing computer readable instructions executable by a processor, the instructions comprising instructions to:
receive frames of image data from the camera unit;

designate a first frame as a long term reference (LTR) frame;

encode a second frame after the first frame and designating the second frame as an LTR frame;

encode a third frame after the second frame, the third frame being an inter frame referring to the first frame;

determine that the second frame is operative to serve as the LTR frame after encoding the third frame; and encode, responsive to the determination, a fourth frame after the third frame, the fourth frame being an inter frame referring to the second frame, wherein the instructions to determine that the second frame is operative to serve as the LTR frame comprise instructions to determine that a predetermined period has elapsed after the second frame was encoded.

16. The non-transitory computer readable medium of claim 15, wherein the second frame is an inter frame referring to the first frame.

17. The non-transitory computer readable medium of claim 15, wherein the second frame is an intra frame.

18. The non-transitory computer readable medium of claim 15, wherein the predetermined period is based on the lapse of time.

19. The data encoding method of claim 15, wherein the instructions to determine that the second frame is operative to serve as the LTR frame further comprise instructions to determine that a fast update request has not been received during the predetermined period.

20. The non-transitory computer readable medium of claim 15, wherein the predetermined period is based on a number of frames encoded.

* * * * *